United States Patent
Axmann

[11] Patent Number: 5,332,083
[45] Date of Patent: Jul. 26, 1994

[54] CURVED BELT CONVEYOR

[75] Inventor: Norbert Axmann, Sinsheim-Ho, Fed. Rep. of Germany

[73] Assignee: Axmann-Fördertechnik GmbH, Sinsheim-Steinsfurt, Fed. Rep. of Germany

[21] Appl. No.: 46,211

[22] Filed: Apr. 9, 1993

[30] Foreign Application Priority Data

Apr. 21, 1992 [DE] Fed. Rep. of Germany ....... 4213035

[51] Int. Cl.⁵ .............................................. B65G 15/02
[52] U.S. Cl. ..................................................... 198/831
[58] Field of Search .................................. 198/840, 831

[56] References Cited

U.S. PATENT DOCUMENTS

| | | | |
|---|---|---|---|
| 3,327,839 | 6/1967 | Sigety et al. | 198/840 |
| 3,901,379 | 8/1975 | Bruhm | 198/831 |
| 4,179,026 | 12/1979 | de Vries | 198/831 |
| 4,227,610 | 10/1980 | Gerdes et al. | 198/831 |
| 4,955,466 | 9/1990 | Almes et al. | 198/831 |

Primary Examiner—Joseph E. Valenza
Attorney, Agent, or Firm—Max Fogiel

[57] ABSTRACT

A curved belt conveyor with a belt that travels around deflection rollers and has an elevation along its outer edge. Smooth out rollers are forced uniformly against the side of the elevation facing the center of curvature.

10 Claims, 2 Drawing Sheets

CURVED BELT CONVEYOR

BACKGROUND OF THE INVENTION

The present invention concerns a curved belt conveyor. The continuous belt is advanced over deflection rollers by a motor. It has an elevation secured to the edge of the belt that constitutes the outer circumference of the curve and traveling along with the belt. The longitudinal and transverse forces that derive from the curvature are compensated for by resiliently mounted smooth-out rollers distributed at intervals along the outer circumference. The smooth-out rollers are forced at a constant pressure against the side of the elevation facing the center of the cure.

Cornering for conveyor belts is known from German Patent 1 120 977. The belt is deflected over tapering drums and has an elevation in the form of wedge cross-section strip vulcanized along the outer edge. The belt is supported and guided by smooth-out rollers that engage the side of the elevation facing the inside of the curve and are resiliently forced against it.

The belt in this cornering system projects out of the outside of the curve and beyond the drums. The strip is vulcanized to the inside of the projecting area. The smooth-out rollers are accordingly also inside the belt loop and are forced sloping from inside to outside against the strip.

The engagement of the smooth-out rollers against the side facing the inside of the curve of the strip vulcanized to the inside of the edge of the belt projecting out beyond the tapering rollers tends to force the projecting edge out. This tendency is counteracted with additional smooth-out rollers that engage the edge of the belt that projects beyond the tapering drums from outside. The additional rollers do not, however, make it possible to channel the belt precisely enough. This is especially true when such cornering must overcome significant elevations, so that the curve must be severely distorted to lift articles from a low horizontal level to a high horizontal level.

SUMMARY OF THE INVENTION

The object of the invention is to solve this problem with an improved curved belt conveyor that will ensure smooth and extensively non-friction channeling of the belt at its outer circumference even when the curve is sharp and the difference between levels considerable.

This object is attained in accordance with the invention in the curved belt conveyor recited in the preamble to claim 1 in that the elevation projects out beyond the belt, in that the smooth-out rollers rotate freely on angled levers, in that the levers pivot on brackets extending outside the curve on pivots remote from the levels of the upper and lower strands of the belt, and in that the distance between the pivots and the strands can be adjusted.

Pivoting the levers that accommodate the smooth-out rollers on brackets remote from the levels of the upper and lower strands and the resilient force against the inner side of the elevation allow precise channeling of the belt around the curve even when it ascends to a considerable height, so that the curve is accordingly distorted. This is true even when due to load or to the distortion of the curve the elevation extends more or less away from a wall demarcating the outer circumference or from the brackets with the pivots that allow the levers to pivot.

The adjustability of the pivots of the levers that accommodate the smooth-out rollers has been demonstrated to be particularly practical in that it facilitates adjusting the smooth-out rollers to the extent that subject to the particular application the edge of the smooth-out roller facing the belt engages the elevation at a distance from the surface of the belt. This design prevents the edges of the smooth-out rollers facing the belt from digging into the belt and damaging it.

A hold-down roller with an axis approximately paralleling the upper surface of the particular strand can rotate freely outside the curve on each hold-down roller accommodating lever, engage the top of the elevation secured to the belt, and force the belt against belt-tracking rollers between the strands.

This embodiment will prevent the belt from lifting off the tracking rollers especially in the vicinity of the lower strand, so that the sloping smooth-out rollers will engage only the side of the elevation facing the inside of the curve and not the adjacent surface of the belt. In this embodiment it has been demonstrated particularly practical for the smooth-out roller and hold-down roller on each lever to be associated such that the edge of the smooth-out roller facing the belt will project beyond the hold-down roller and toward the belt by less than the thickness of the elevation above the upper surface of the belt.

Another practical embodiment of the invention is characterized by means of resiliently forcing the smooth-out rollers against the inner side of the elevation in the form of tension springs that extend between the ends of the levers opposite their pivots and either the brackets outside the curve and the bracket or a wall.

The springs can also to advantage be attached to bolts that can be adjusted perpendicular to the brackets or wall to vary their tension. This approach facilitates adjusting the forces exerted by the smooth-out rollers in accordance with changes that occur due to the particular application, so that the outer radius of the curve will be appropriate for each.

It is practical for the means that engage the elevation secured to the belt and compensate at the top and bottom of the belt for any longitudinal and transverse forces in one advanced version of the invention to be similar or symmetrical.

BRIEF DESCRIPTION OF THE DRAWINGS

One embodiment of the invention will now be specified by way of example with reference to the schematic drawing, wherein.

DESCRIPTION OF THE PREFERRED EMBODIMENTS

Figure 1:
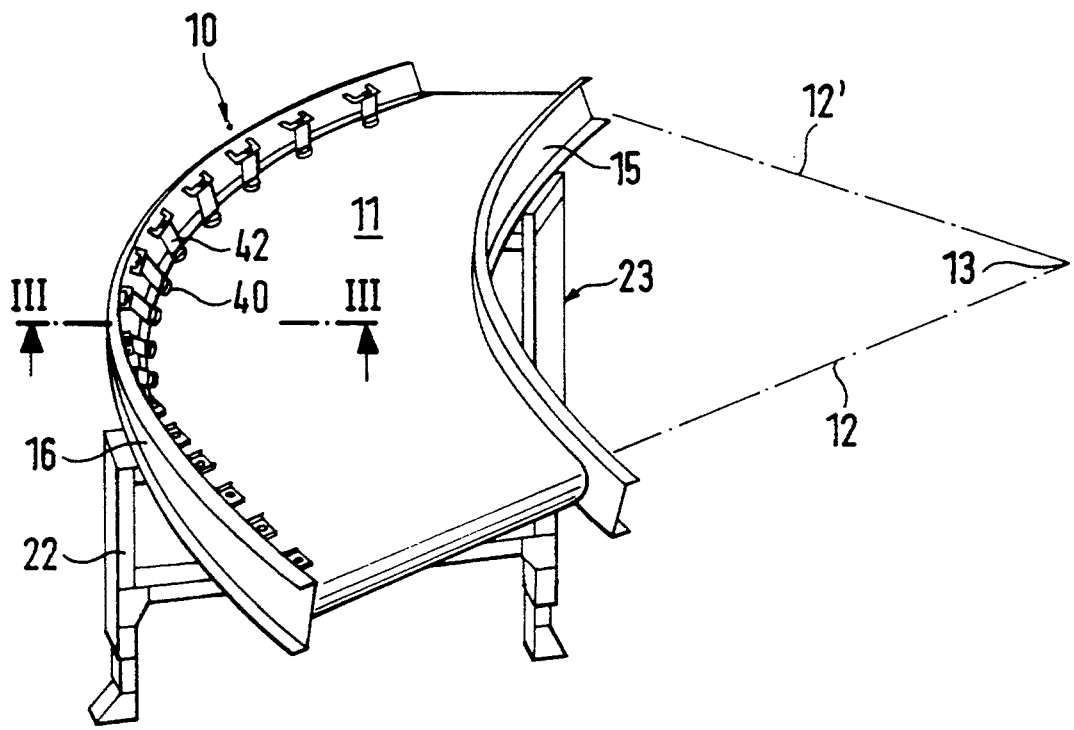
FIG. 1 is a perspective view of a curved belt conveyor with a belt that slopes up from one deflection roller to the other.

The curved belt conveyor 10 illustrated in FIG. 1 extends along an annular arc and has a belt 11 in the form of a continuous band. Belt 11 consists of cemented-together truncated-conical segments and travels around deflection rollers at each end. The axes 12 and 12' of the deflection rollers intersect at the center 13 of curvature as viewed from above. Either the rollers slope up conically from the inner to the outer circumference of the curve or the belt is deflected by one roller from axially adjacent cylindrical sections freely rotating in the vicinity of upper strand 14 and a conical deflection roller below it at the transition to lower strand 14'.

The belt 11 illustrated in FIG. 1 slopes steeply up from one deflection roller to the other, and the curve is accordingly severely distorted. The belt travels between an inside wall 15 and an outside wall 16, around the deflection rollers, and over belt-backing rollers 18 between strands 14 and 14. Belt-backing rollers 18 themselves consist of axially adjacent sections 20 that rotate freely around an axis 19. Belt-backing rollers 18 are mounted by a method of no interest in the present context against the walls 15 and 16 of conveyor 10. The walls themselves are secured to a base 23 comprised of uprights 22.

Figure 2:
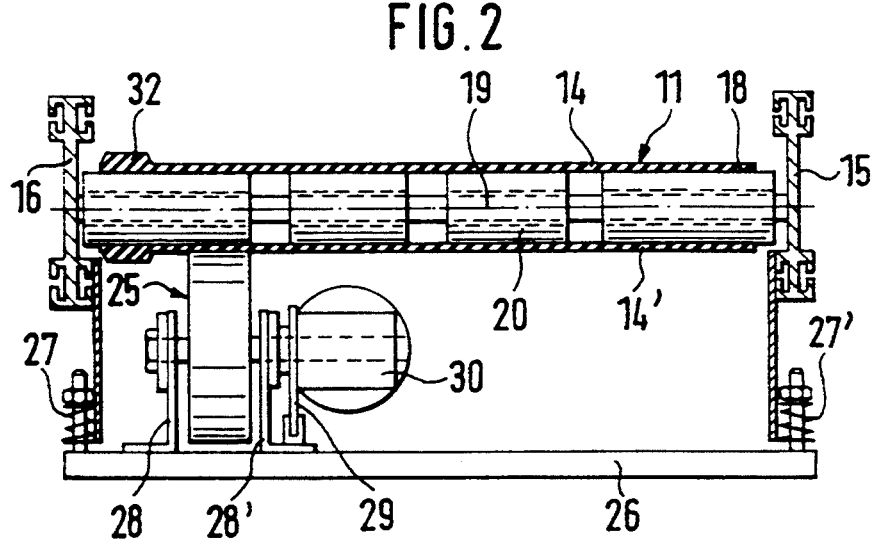
FIG. 2 is a section through the conveyor illustrating how it is advanced by a motor and friction wheel.

As will be evident from FIG. 2, the belt is provided with an elevation 32 that extends along the edge that constitutes the outer circumference and above the surface of the belt facing away from belt-backing rollers 18. Smooth-out rollers, illustrated schematically in FIG. 1 and unillustrated in FIG. 2, rest against the side of elevation 32 facing the center of curvature. The smooth-out roller will be further specified hereinafter.

Belt 11 is forwarded by a friction wheel 25 that engages lower strand 14'. The overall drive mechanism is mounted on a bracket 26 that extends below and over the whole width of belt 11 and is attached to walls 15 and 16, resting against the latter by way of resilient springs 27 and 27'. The friction wheel is mounted in uprights 28 and 28' on bracket 26 and is rotated by a motor 30 mounted on a torque support 29 by a method of no particular interest herein.

Figure 3:
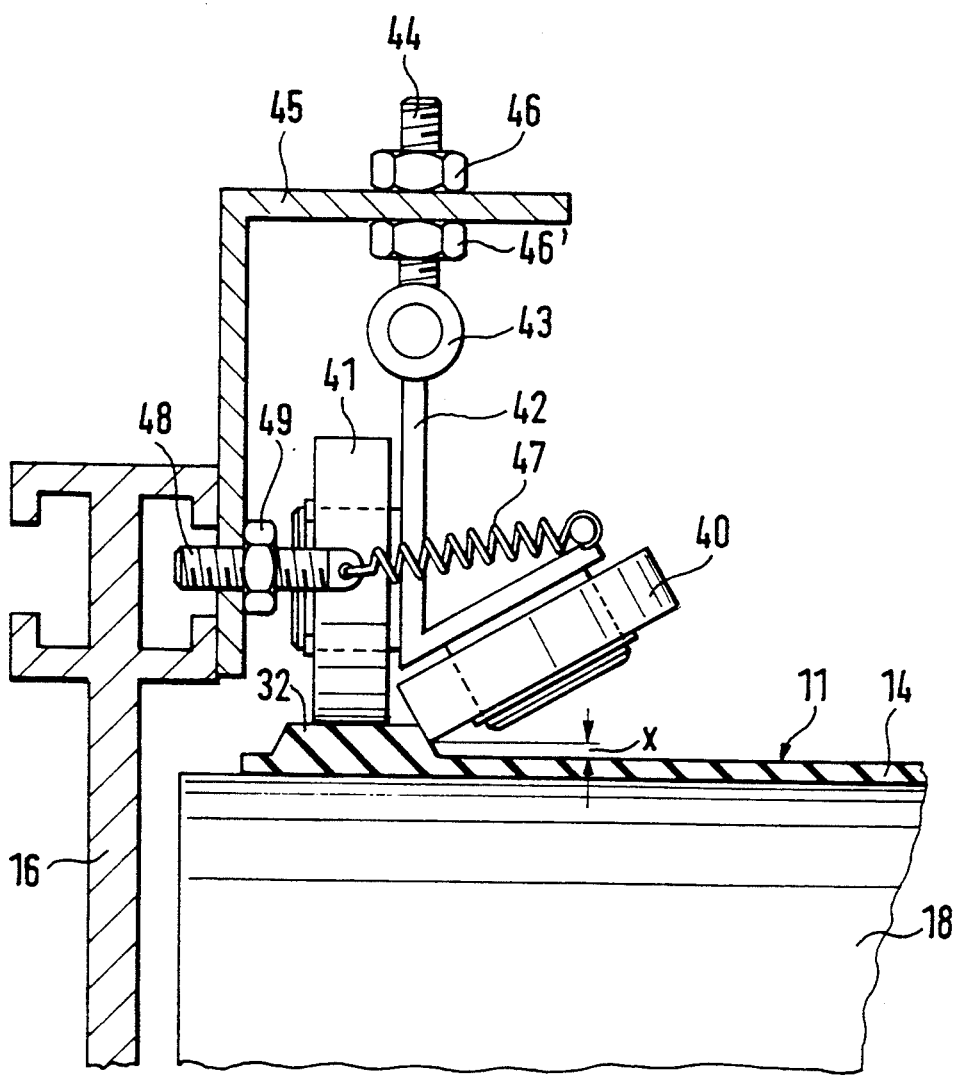
FIG. 3 is a larger-scale section through the line III—III in FIG. 1 illustrating how longitudinal and transverse forces deriving from the curvature of the belt are compensated for by smooth-out rollers that engage an elevation projecting above the level of the belt along the outer circumference of the curve.

From the section in FIG. 3 in conjunction with the section in FIG. 2 it will be evident that belt 11 is provided with an elevation 32 that extends along the edge that constitutes the outer circumference and above the surface of the belt facing away from belt-backing rollers 18. Elevation 32 is inseparable from belt 11 and travels along with it. The longitudinal and transverse forces that occur are accommodated by sloping smooth-out rollers 40 that rest against the side of the traveling elevation 32 facing the center 13 of curvature. Smooth-out rollers 40 are as will be evident from FIG. 1 distributed at prescribed intervals along the total outer circumference and uniformly engage the inner side of the elevation in the vicinity of strands 14 and 14'.

Smooth-out rollers 40 rotate freely on the ends of angled levers 42. Levers 42 pivot on brackets 45 mounted on outside wall 16 at pivots 43. The areas tensioned by sloping smooth-ut rollers 40 extend at an acute angle to the associated strand of belt 11. The rollers are resiliently forced against the side of elevation 32 facing the center of curvature. The force is generated by tension springs 47 remote from the pivots 43 of the levers 42 that accommodate smooth-out rollers 40. The springs engage the levers and are secured to countervailing bearings in outside wall 16 that will be further specified hereinafter.

Any unavoidable longitudinal and transverse forces that occur as belt 11 circulates are accommodated by the smooth-out rollers 40 that rest against the side of elevation 32 facing the center of curvature. Any irregularities in the advance of the belt are compensated for by the resilient force of the rollers mounted on the pivoting levers 42. It has been demonstrated that wear on elevation 32 and belt 11 deriving from the pressure of smooth-out rollers 40 can be maintained very slight.

FIG. 3 illustrates only how the elevation 32 on upper strand 14 is engaged. The mechanisms and actions in the vicinity of the lower strand are identical.

In this embodiment pairs comprising one smooth-out roller 40 and one hold-down roller 41 rest against the elevation 32 at the edge of belt 11, the hold-down rollers against the top of the elevation and the smooth-out rollers against its inner side. Since the same situation occurs at the lower strand, the two strands will always rest precisely against belt-backing rollers 18.

Each smooth-out roller 40 rotates freely at an acute angle and each hold-down roller 41 perpendicular to belt 11 on the same lever 42. The lever pivots at pivot 43 on a countervailing bearing 44 that can be raised or lowered in a bracket 45 secured to outside wall 16. The bracket is an upside-down L with its upright secured to outside wall 16 and the its arm projecting toward the center 13 of curvature at a level above the belt. The countervailing bearing 44 for the lever 42 that hold-down roller 41 and smooth-out roller 40 rotate on is a threaded bolt that extends through the arm and is adjusted in height by nuts 46 and 46' that screw tight against the arm.

The hold-down roller 41 in each pair of rollers is maintained in position by raising or lowering countervailing bearing 44 and hence the pivot 43 that the lever 42 accommodating rollers 40 and 41 pivots from. The oblique smooth-out roller 40, however, is as aforesaid forced against the side of elevation 32 facing the center of curvature by tension spring 47. One end of tension spring 47 is attached to roller-accommodating lever 42 and the other end to another countervailing bearing in the form of a bolt 48 secured to outside wall 16. Bolt 48 is threaded and screws into a matching threaded bore of the bracket 45 of outside wall 16. The bolt is maintained in adjustment to the bracket and wall by a nut 49.

This embodiment particularly facilitates precise adjustment of smooth-out roller 40 in relation to the side of elevation 32 facing the center of curvature to the extent that the edge of the roller facing the surface of the strand will be separated a distance x from the surface that prevents it from damaging the belt. This feature is especially appropriate in relation to the lower strand, which tends to sag under its own weight off belt-backing rollers 18. This tendency is counteracted by the hold-down rollers 41 mounted on pivoting lever 42 in conjunction with smooth-out rollers 40 in that the surface of each roller 41 pressed against the elevation 32 on the outer surface of the strand and secures it against belt-backing rollers 18.

I claim:

1. A curved belt conveyor comprising: a continuous belt with upper and lower strands advanced over deflection rollers by a motor; an elevation secured to an edge of said belt and being an outer circumference of a curve and traveling along with said belt, said curve having a center of curvature resiliently mounted smooth-out rollers distributed at intervals along said outer circumference and forced at constant pressure against a side of said elevation facing said center of curvature for compensating longitudinal and transverse forces deriving from the curvature; said elevation projecting out beyond said belt; angled levers, said smooth-out rollers rotating freely on said angled levers; said levers pivoting on brackets extending outside said curve on pivots remote from levels of the upper and lower strands of the belt; a distance between said pivots and said strands being adjustable.

2. A curved belt conveyor as defined in claim 1, including a hold-down roller with an axis approximately paralleling an upper surface of a particular strand rotating freely outside said curve on each hold-down roller accommodating one of said levers, said hold-down roller engaging a top of said elevation secured to said belt and forcing said belt against belt-tracking rollers between said strands.

3. A curved belt conveyor as defined in claim 2; wherein said elevation has a thickness, a smooth-out roller and hold-down roller on each lever being associated such that an edge of said smooth-out roller facing said belt projects beyond said hold-down roller and toward said belt by less than the thickness of said elevation above an upper surface of said belt.

4. A curved belt conveyor as defined in claim 1, including means for resiliently forcing said smooth-out rollers against an inner side of said elevation and comprising tension springs extending between ends of said levers opposite said pivots and said brackets outside said curve.

5. A curved belt conveyor as defined in claim 1, including means for resiliently forcing said smooth-out rollers against an inner side of said elevation and comprising tension springs extending between ends of said levers opposite said pivots and said brackets.

6. A curved belt conveyor as defined in claim 1, including means for resiliently forcing said smooth-out rollers against an inner side of said elevation and comprising tension springs extending between ends of said levers opposite said pivots and a wall.

7. A curved belt conveyor as defined in claim 4, wherein said springs are attached to bolts adjustable perpendicular to said brackets to vary tension of said springs.

8. A curved belt conveyor as defined in claim 4, wherein said springs are attached to bolts adjustable perpendicular to said wall to vary tension of said springs.

9. A curved belt conveyor as defined in claim 1, including means engaging said elevation secured to said belt and compensating at the top and bottom of said belt for any longitudinal and transverse forces, said means engaging said elevation being similar.

10. A curved belt conveyor as defined in claim 1, including means engaging said elevation secured to said belt and compensating at the top and bottom of said belt for any longitudinal and transverse forces, said means engaging said elevation being symmetrical.

* * * * *